(12) United States Patent
Denmon

(10) Patent No.: US 11,013,329 B2
(45) Date of Patent: May 25, 2021

(54) INTEGRATED BLIND SEAT SYSTEM

(71) Applicant: Huntwise, Inc., Monroe, LA (US)

(72) Inventor: Terry Denmon, Monroe, LA (US)

(73) Assignee: Huntwise, Inc., Monroe, LA (US)

( * ) Notice: Subject to any disclaimer, the term of this patent is extended or adjusted under 35 U.S.C. 154(b) by 0 days.

(21) Appl. No.: 16/052,025

(22) Filed: Aug. 1, 2018

(65) Prior Publication Data

US 2019/0045930 A1 Feb. 14, 2019

Related U.S. Application Data

(60) Provisional application No. 62/543,542, filed on Aug. 10, 2017.

(51) Int. Cl.
| | | |
|---|---|---|
| *A47C 1/00* | (2006.01) | |
| *A47C 3/18* | (2006.01) | |
| *A47C 15/00* | (2006.01) | |
| *E04H 15/00* | (2006.01) | |
| *A01M 31/02* | (2006.01) | |

(52) U.S. Cl.
CPC ............ *A47C 3/18* (2013.01); *A01M 31/025* (2013.01); *A47C 15/004* (2013.01); *E04H 15/001* (2013.01); *A47C 1/00* (2013.01)

(58) Field of Classification Search
CPC .... A47C 1/00; A47C 3/18; A47C 3/20; A47C 7/004; A47C 7/006; A47C 9/022; A47C 9/02; A47C 15/004; E04H 15/001; A01M 31/025; A47B 83/02; B60N 2/0715
See application file for complete search history.

(56) References Cited

U.S. PATENT DOCUMENTS

| | | | | |
|---|---|---|---|---|
| 624,869 | A * | 5/1899 | Rudy et al. ............ | A47C 9/022 297/142 |
| 1,344,940 | A * | 6/1920 | Gavin .................... | A47C 9/022 297/142 |
| 1,944,765 | A * | 1/1934 | Sheldon ................. | A47B 39/08 297/142 |
| 2,969,108 | A | 1/1961 | Macknight | |
| 3,709,555 | A * | 1/1973 | Ostertag ................ | A47C 3/00 297/142 |

(Continued)

FOREIGN PATENT DOCUMENTS

| | | | | |
|---|---|---|---|---|
| CN | 107788723 A | * | 3/2018 | ............. A47B 83/02 |
| EP | 1707076 A2 | * | 10/2006 | ............. A47C 9/022 |

OTHER PUBLICATIONS

Change Up Chair, Nature Blinds Change-Up Chair, retrieved from: http://www.cabelas.com/product/hunting/hunting-blinds/stools-chairs-seat-cusions%7C/pc/104791680/c/104702580/sc/104607180/nature-blinds-change-up-chair/2028227.uts?destination=%2Fcategory%2FHunting-Blind-Stoos-Chairs-Seat-Cusions%2F104607180.uts.

(Continued)

*Primary Examiner* — Ryan D Kwiecinski
(74) *Attorney, Agent, or Firm* — Robert Devin Ricci; Lauren J. Rucinski; Kean Miller LLP

(57) ABSTRACT

A seating system for blind use that is quiet and allows movement and turning with little effort. The blind seating system comprises a seat assembly, support frame, and adjustable tether arm. The seat height may be adjustable to accommodate persons of different sizes. It also accommodates multiple persons and allows each to adjust their position relative to the blind floor plan and each other, which is particularly useful when helping others to hunt, observe, photograph, or film.

16 Claims, 8 Drawing Sheets

(56) References Cited

U.S. PATENT DOCUMENTS

| | | | |
|---|---|---|---|
| 4,926,893 A * | 5/1990 | Klopfenstein | E04H 15/001 |
| | | | 135/116 |
| 4,979,458 A | 12/1990 | Bouza | |
| 5,540,160 A * | 7/1996 | Rea | A47C 9/022 |
| | | | 112/217.2 |
| 5,673,968 A * | 10/1997 | Ponzio | A47C 9/022 |
| | | | 297/143 |
| 6,394,545 B2 | 5/2002 | Knoblock et al. | |
| 6,460,653 B1 | 10/2002 | Hardy | |
| 6,755,381 B1 * | 6/2004 | Levin | F16M 11/16 |
| | | | 248/163.1 |
| 7,246,683 B2 | 7/2007 | Pringnitz | |
| 7,658,140 B2 | 2/2010 | Lombardi | |
| 7,802,582 B2 | 9/2010 | Livacich et al. | |
| 8,376,083 B1 | 2/2013 | Dawes | |
| 8,869,938 B2 | 10/2014 | Bassett | |
| 9,033,105 B1 | 5/2015 | Bosweel | |
| 9,301,518 B1 | 4/2016 | Burque | |
| 2004/0195885 A1 | 10/2004 | Simpson | |
| 2005/0274573 A1 | 12/2005 | Smith | |
| 2007/0089929 A1 | 4/2007 | Schriewer | |
| 2008/0036257 A1 * | 2/2008 | Almy | A47C 3/34 |
| | | | 297/256.17 |
| 2008/0202573 A1 | 8/2008 | Corbiere | |
| 2008/0217104 A1 | 9/2008 | Bergeron | |
| 2011/0227382 A1 * | 9/2011 | Hay | A47C 9/022 |
| | | | 297/242 |
| 2016/0021869 A1 | 1/2016 | George | |
| 2016/0083972 A1 * | 3/2016 | Hayes | A01M 31/025 |
| | | | 135/121 |
| 2016/0374472 A1 * | 12/2016 | Horn | A47C 9/06 |
| | | | 297/344.21 |
| 2017/0273451 A1 * | 9/2017 | Jeanphilippe | A47C 4/24 |
| 2018/0010875 A1 * | 1/2018 | Chism | A01M 31/025 |
| 2018/0014529 A1 * | 1/2018 | Litwin | F41A 23/18 |
| 2018/0172385 A1 * | 6/2018 | Hale | A47B 37/00 |

OTHER PUBLICATIONS

Swivel Seat, The All Terrain Seat, retrieved from: http://darkwoodsblind.com/HUNTING-CHAIRS.html.

* cited by examiner

FIGURE 5a
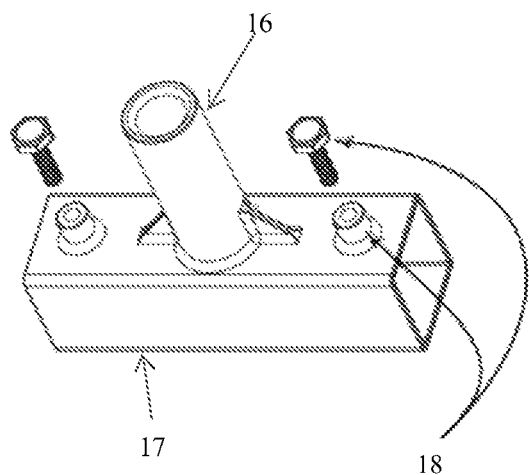
FIGURE 5b
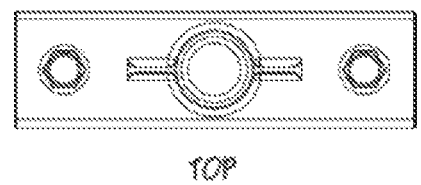
TOP
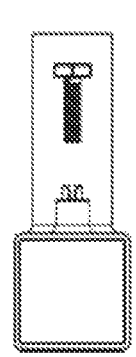
LEFT
FIGURE 5c
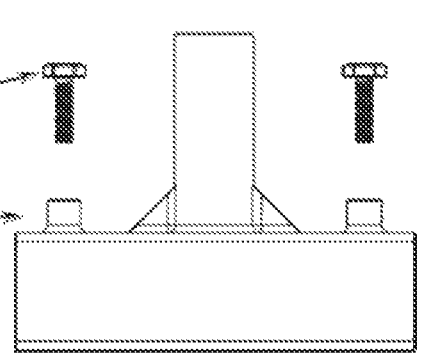
FRONT
FIGURE 5d

INTEGRATED BLIND SEAT SYSTEM

CROSS REFERENCE TO RELATED APPLICATIONS

This application claims priority to U.S. application No. 62/543,542 entitled "Blind Seat System" filed Aug. 10, 2017. The disclosure of the referenced application is hereby incorporated herein in its entirety by reference.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the Integrated Blind Seat System, which may be embodied in various forms. It should be understood that the drawings are not necessarily to scale; instead, emphasis has been placed upon illustrating the principles of the invention. In addition, in the embodiments depicted herein, like reference numerals in the various drawings refer to identical or near identical structural elements.

FIG. 5a is a perspective depiction of the sliding hinge receptacle. FIG. 5b is a top depiction of the sliding hinge receptacle. FIG. 5c is a left side depiction of the sliding hinge receptacle. FIG. 5d is a front view depiction of the sliding hinge receptacle.

BACKGROUND

Figure 1:
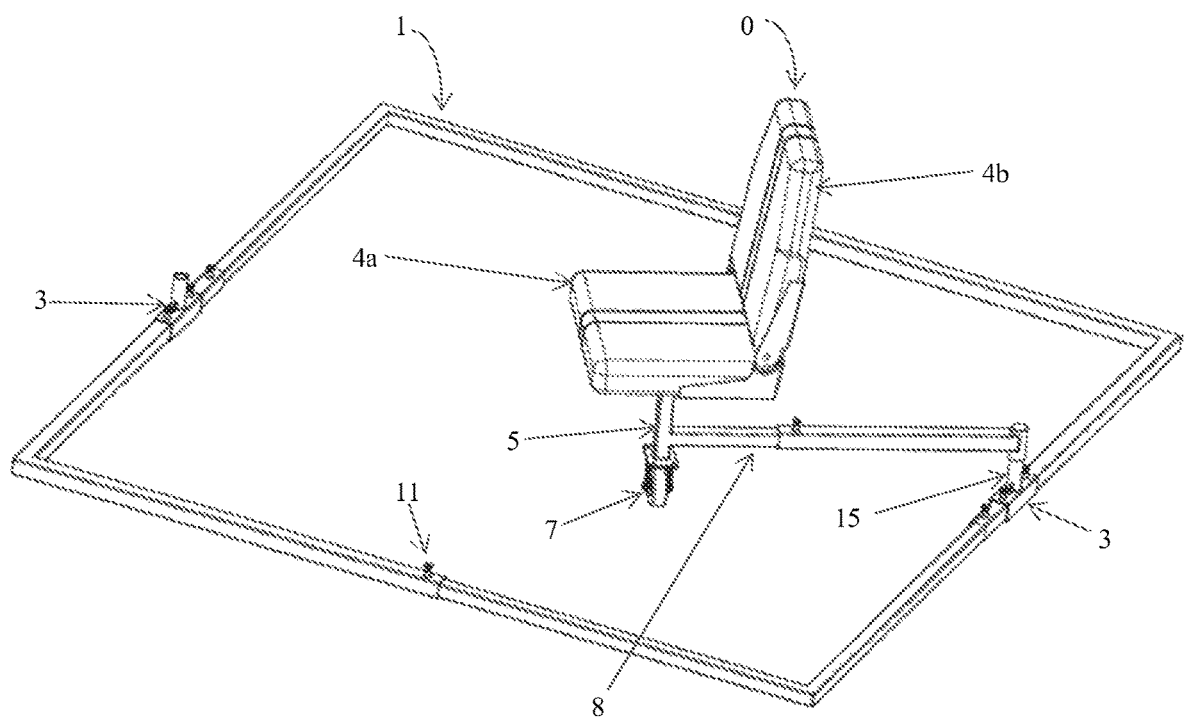
FIG. 1 is an assembled view of the Integrated Blind Seat System.

A blind is an enclosure designed to hide or camouflage the user and often times provides shelter from the elements. Blinds are used in a variety of applications including: to observe nature, to perform scientific studies or gather environmental samples, to photograph nature, and to engage in sportsman and hunting activities. Blinds may be constructed solely of natural vegetation, but are often times more permanent structures with frames of wood, plastic, metal poles, wire, mesh, webbing, or other materials. Blinds may also be decorated with foliage-like components to aid in camouflaging or blending in with the environment. Additionally, blinds may be free standing or integrated into the natural environment such is the case with tree stands.

The concept of a blind has been known for centuries. However, modern blinds are often complex structures with highly developed insulation, concealment means, and observation arrangements to maximize efficiency and user comfort. For example, modern blinds have multiple observation windows, cross wind containment means, and sophisticated insulation for keeping the user shielded from the elements and/or concealed from wildlife.

Although current technology provides more effective blinds, the user seating system located within the blind continues to pose challenges. For example, multiple viewing ports or windows allow the user to observe or hunt from many vantage points; however, moving from one side of the blind to another to reach these multiple viewing ports inevitably creates undesirable racket and noise.

Noise minimization is a vital component of successful blind use. A blind user must often move around within the blind to get a better vantage point, make use of multiple windows, or to simply stretch after long hours of immobility. Current seating arrangements are bulky and clumsy at best. They do not offer a quiet and efficient means to allow a user to change position within the blind. Therefore, a seating system is needed within the blind that allows the user to move freely around the blind with minimum noise and optimum comfort. Additionally, seating systems become especially cumbersome when more than one user occupies the blind and/or when additionally equipment is located in the blind.

Blinds are sometimes equipped with multiple, individual chairs. Such chairs typically resemble office-type chairs with expanded bases and either stationary legs or rollers, making them difficult to move around the blind. Traditional chairs are bulky and lead to collisions with the walls of the blind, other occupiers, goods or equipment on the blind floor, and the user's own feet. Furthermore, they allow multiple occupants to tangle with one another so that one may be positioned between a second occupant and the window of the blind. This is particularly problematic when hunting as the space between a blind window and the hunting rifle of another occupant is understandably dangerous.

The current inventive system solves these problems by mounting one or more seats to a structural frame with a supporting arm that is sometimes telescopic. The structural frame provides a rail system that is adjustable and is capable of fitting against the exterior walls of the blind, or in other embodiments, may form the exterior walls of the blind, or may be positioned as desired by the user within the blind. The invention also provides for one or more seats to be mounted to, and swivel around, the rail system, and that secondarily swivel on the support arm. These multiple degrees of freedom allow the user to move the seat to desired locations within the blind and to rotate the seat as desired, facing in any direction, all with minimum noise and effort.

The basic principal of the blind seating system is to provide a seating system for blind use that is quiet and allows movement and turning with little effort. In further embodiments, the seating height may be adjustable to accommodate persons of different sizes. It also accommodates multiple persons and allows each to adjust their position relative to the blind floor plan and each other, which is particularly useful when helping others to hunt, observe, photograph, or film.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Furthermore, the described features, structures, or characteristics may be combined in any suitable manner in one or more embodiments. In the following description, numerous specific details are provided, such as examples of materials, connecting means, and dimensions. One skilled in the relevant art will recognize, however, that the Integrated Blind Seat System may be practiced without one or more of the specific details, or with other methods, components, materials, and so forth. In other instances, well-known structures, materials, or operations are not shown or described in detail to avoid obscuring aspects of the invention.

FIG. 1 depicts an assembled view of an embodiment of the Integrated Blind Seat System (the "system"), which generally comprises a seat assembly 0 and a structural support frame 1. In one embodiment, the system is mobile for use in mobile blinds or for use in multiple blinds. In this embodiment, the components are connected to each other and to the frame via removable connecting means and the structural support frame 1 is made of light weight material that is structurally sound. In another embodiment, the Integrated Blind Seat System may be permanently or semi-permanently attached to the walls of a blind, the floor of the blind, to the external environment or some combination thereof.

Figure 2:
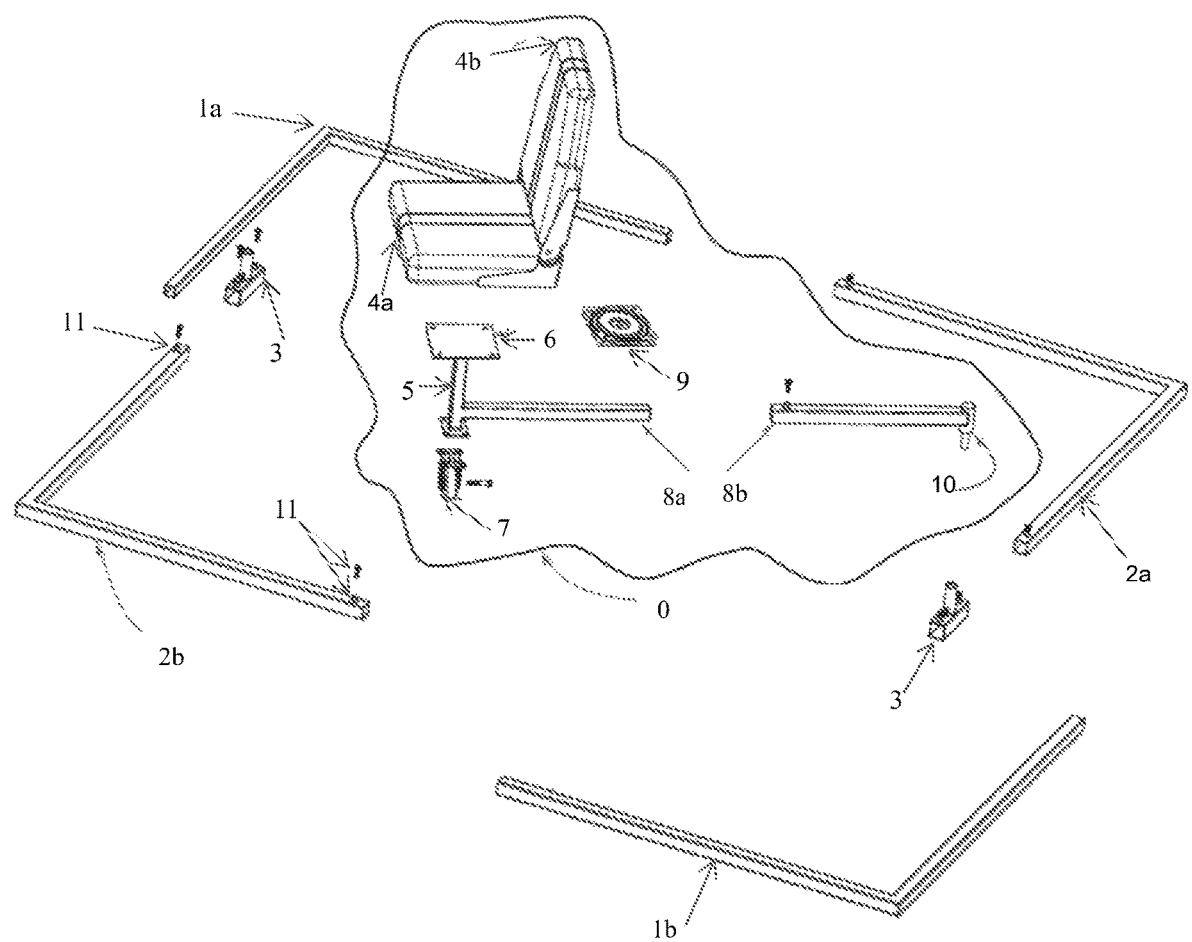
FIG. 2 is an exploded view of the Integrated Blind Seat System.

As depicted in FIG. 2, the structural support frame 1 comprises two inner frame sections 1a, 1b, two outer frame sections 2a, 2b, a sliding hinge receptacle 3, and a locking means 11. In one embodiment, the frame sections 1a, 1b, 2a, 2b are polygonal tubing. In another embodiment, the frame sections are rounded tubing. In yet another embodiment, the frame sections are made of piping. In one embodiment, the frame sections 1a, 1b, 2a, 2b are made of metal, for example, aluminum or steel. In other embodiments, the frame sections 1a, 1b, 2a, 2b are made of plastic such as polyvinyl chloride. In other embodiments, any suitable structurally sound and lightweight material is used.

As depicted in FIG. 2, the two inner frame sections 1a, 1b and two outer frame sections 2a, 2b connect to form a rectangular frame. In one or more embodiments, the inner frame sections 1a, 1b are diametrically smaller than the two outer frames 2a, 2b. In other embodiments, each of the frame sections 1a, 1b, 2a, 2b are identical and one end of each of the frame sections 1a, 1b, 2a, 2b is tapered (for example, FIG. 3 1b') while the other end of each of the frame sections 1a, 1b, 2a, 2b is not tapered (for example, FIG. 3b 2a"). The tapered end of one frame section fits within the non-tapered end of another frame section.

The shape and size of the frame is dependent on the shape and size of the blind. In the depicted embodiment of FIGS. 2 and 3a,b, the two inner frame sections 1a, 1b and two outer frame sections 2a, 2b are different sizes such that the ends of the inner frame sections 1a, 1b may be inserted into the ends of the outer frame sections 2a, 2b at any incremental distance, creating a telescoping affect. This effect allows the structural support frame 1 to fit against the walls of varying sized blinds. The user may also desire for the structural support frame 1 to be confined to a certain portion of the blind. In that case, the telescoping effect allows the user to position and size the structural support frame 1 in various positions. For example, the user may desire that the structural support frame 1 be positioned in only one half of the blind so that equipment or other objects may be positioned on the other half of the blind. In that case, the user may telescope the frame sections 1a, 1b, 2a, 2b according to the dimensions of half of the blind. In one embodiment, the two inner frame sections 1a, 1b and two outer frame sections 2a, 2b are configured to fit a blind between 3 feet by 3 feet and 6 feet by 6 feet.

In other embodiments, additional frame sections may be added or removed to accommodate non-rectangular blinds. For example, two extra frame sections may be added to accommodate a hexagon-shaped blind. In another example, only three frame sections are used to form a triangular support form 1. In other embodiments still, the structural support frame 1 is circular. The current invention is adaptable to function with any number of shaped blinds.

In one or more embodiments, the structural support frame 1 does not rest on the floor of the blind. Rather, it is connected to the walls of the blind. In that case, the structural frame is fixed to the walls of the blind via a wall attaching means. In one embodiment, the wall attaching means comprises multiple bolts of screws. In another embodiment, the wall attaching means further comprises multiple hooks or ledges on which the structural support frame 1 rests.

In one or more embodiments, the user may wish to permanently or semi-permanently attach the structural support frame 1 to the blind. In that case, the structural support frame 1 further comprises a means for attaching the structural support frame 1 to the blind. In a suitable embodiment, the structural support frame 1 is bolted or screwed into the floor of the blind, the walls of the blind, or some combination thereof.

Figure 3A:
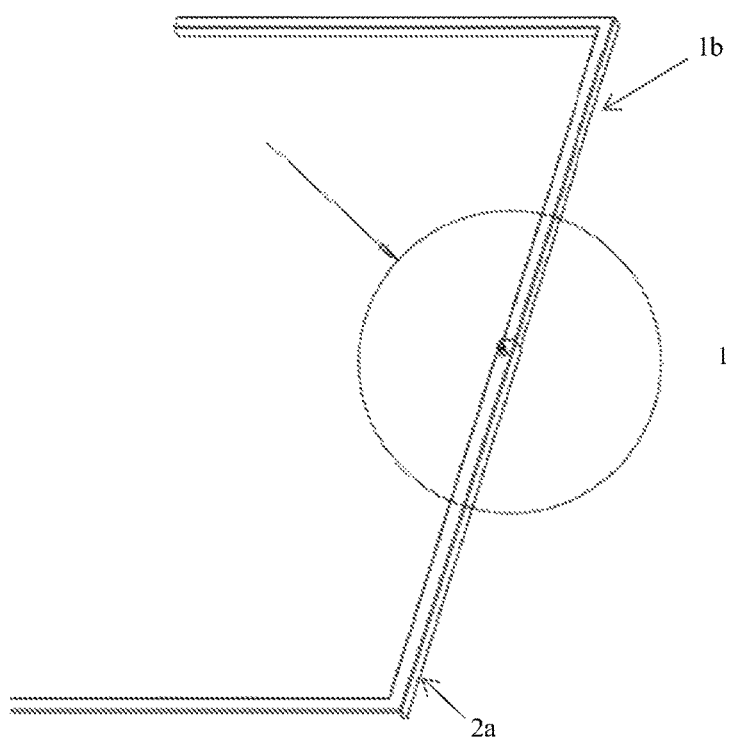
FIG. 3a is depiction of the frame locking means.
Figure 3B:
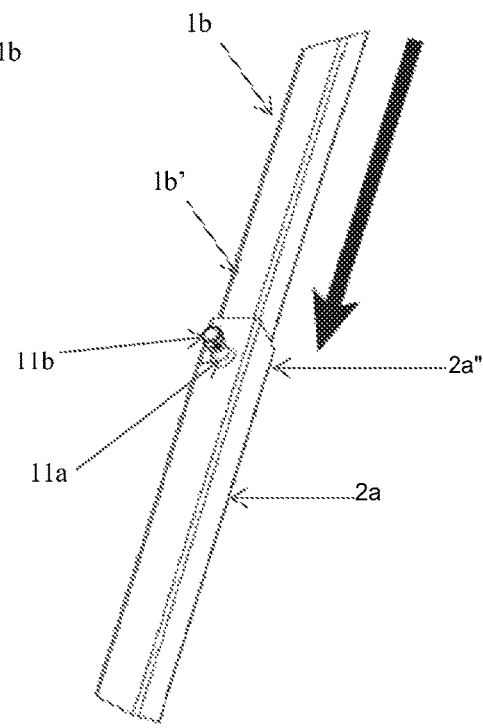
FIG. 3b is a close up depiction of the frame locking means.

Once the frame sections are assembled in the blind, and telescoped as necessary to fit within the blind or to form the perimeter/exterior walls of the blind, the two inner frame sections 1a, 1b are secured to the two outer frame sections 2a, 2b via a locking means 11. As depicted in FIG. 3a, b, in one embodiment, the locking means 11 is locking nut and bolt. However, any number of locking means may be used such as jam nuts, cotter pins, and lock washers.

In one or more embodiments and as depicted in FIG. 3a, b, the outer frame sections 2a, 2b comprise a hole at each end of the frame 11a, on the top of the frame section 2a, 2b such that a bolt or pin 11b or other locking means may be inserted into each hole. In this embodiment, the inner frame sections 1a, 1b comprise holes (not pictured) suitably spaced and sized so that a bolt or pin or other locking means may be inserted through one of the holes on the outer frame sections 2a, 2b and into a hole of the inner frame section 1a, 1b. A suitable spacing for the holes is 1 to 6 inches apart. However, other spacing's may be used to vary the level of customizability of the size and shape of the frame. In other embodiments in which each frame section 1a, 1b, 2a, 2b is identical, such holes may be suitably spaced and sized to the length of the frame sections so that a bolt or pint or other locking means may be inserted through the attached frames as desired by the user.

If the frame sections form the exterior walls of the blind, the frame sections may be decorated or disguised to match the environment. For example, the frame sections may be painted in shades of green, brown (land), or blue (water or sky) depending on the location of the blind. The frame sections may also further comprise foliage designs or attachments to aid in concealing the blind.

Figure 4A:
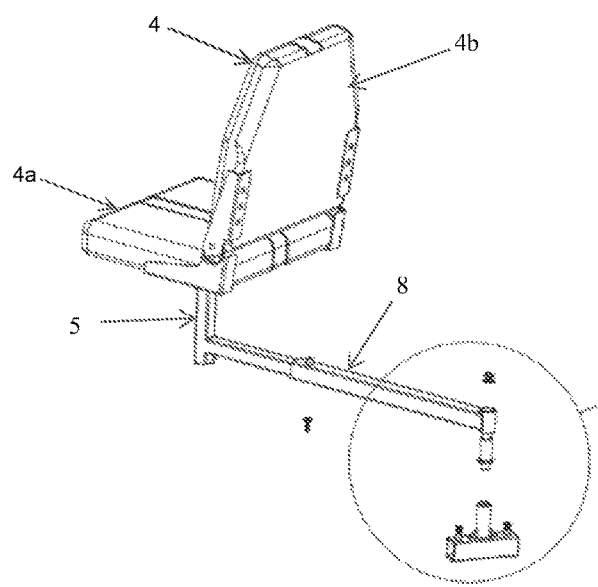
FIG. 4a is an exploded view of the sliding hinge receptacle.
Figure 4B:
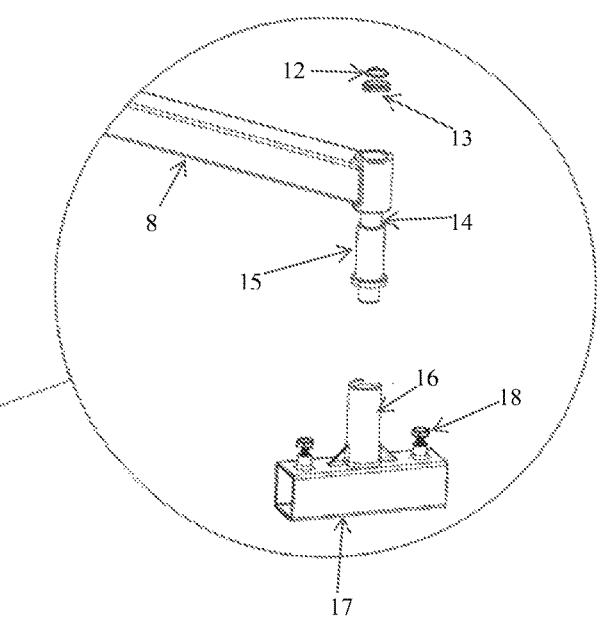
FIG. 4b is a close up view of the sliding hinge receptacle.
Figure 6A:
FIG. 6a is a depiction of the translation of the sliding hinge receptacle.
Figure 6B:
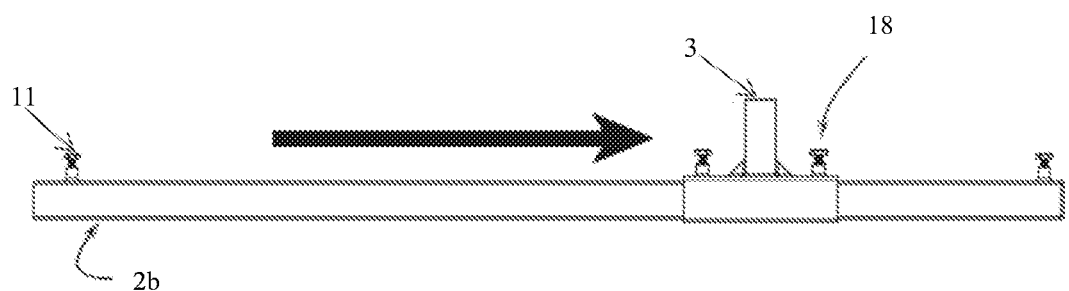
FIG. 6b depicts the sliding capabilities of the sling hinge receptacle.
Figure 8:
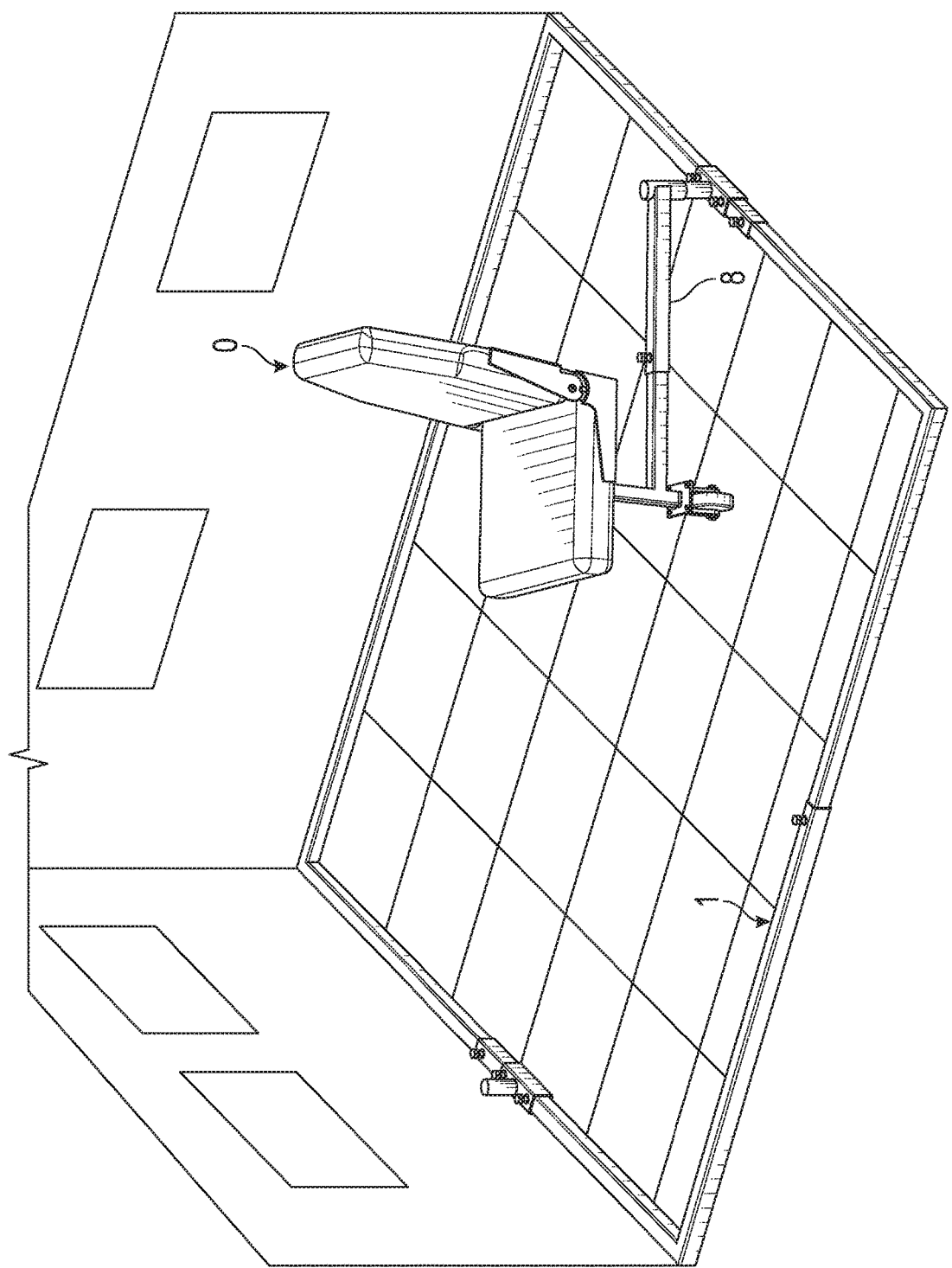
FIG. 8 is a cutaway view of a blind with an embodiment of the Integrated Blind Seat System.

The sliding hinge receptacle 3 is a sliding coupler that is placed over a section of the support frame. The sliding hinge receptacle 3 is attached to the tether arm 8 so that the tether arm 8 rotates in an arc around the sliding hinge receptacle 3. In one embodiment as depicted in FIGS. 4*a, b* and 5*a, b, c, d*, the sliding hinge receptacle comprises a horizontal member 17 that corresponds to the size and shape of one or more of the frame sections 1*a*, 1*b*, 2*a*, 2*b* and a vertical member 16 that corresponds to the size of the tether arm hinge 10. As shown in FIG. 6*a, b*, the sliding hinge receptacle 3 is traversed (or slid) along the structural support frame 1 before being secured. This movement allows the user to position the seat 4 at a number of locations along the perimeter as depicted in FIG. 8. For example, the user may choose to position the hinge receptacle underneath or within reaching distance of one or more windows. Once the sliding hinge receptacle 3 is in the desired position, it is secured via a securing means 18. A suitable securing means 18 includes a locking nut and bolt as depicted in FIG. 5*a, b, c, d*. However, any removable locking means may be used. In one or more embodiments, the sliding hinge receptacle 3 is placed over the intersection of two frame sections and secured so that it acts as the locking means 11.

In the depicted embodiment, the seat assembly 0 further comprises a horizontal member which forms a seat 4, vertical support member 5 depending from the seat towards the floor of the blind 4, seat plate 6, an optional wheel 7, a tether arm 8, seat swivel 9, and tether arm hinge 10. All seats are located within the frame sections 1*a*, 1*b*, 2*a*, 2*b* resulting in total external stability. Furthermore, because the seat has a limited connection with the floor of the blind through the wheel means directly under the seat, the floor of the blind remains relatively clear. The wheel and seat riser work together to offset the weight of the user and static and dynamic stresses on the system 0. This feature allows the user to move about the blind without being concerned over contacting its feet with the seating system. In other embodiments, the seat has no connection with the floor and the user's weight is bore by the tether arm. In one embodiment, the seat is connected to the structural support system via a cantilever arm and no wheel underneath the seat is necessary.

The seat 4 allows for a user to sit conformably and upright. In one embodiment, the seat 4 comprises a lower support 4*a*. The lower support may be constructed of a single material or of multiple materials. In another embodiment, the seat 4 comprises a lower support 4*a* and a back support 4*b*. The size of the back support 4*b* may vary depending on comfort level desired. In one embodiment, the seat comprises a lower support comprised of plastic and a back support comprised of plastic. In another embodiment, the seat comprises a lower support 4*a* further comprising a cushion secured to the lower support 4*a* via glue, straps, Velcro, or some other suitable supporting means and a back support 4*b* comprised of plastic. In other embodiments, the lower support 4*a* and back support 4*b* are constructed from any suitable material so that noise is minimized when the user shifts its weight. In one or more embodiments, the lower support 4*a* and back support 4*b* are made of weather proof material. In one or more embodiments, the lower support 4*a* and back support 4*b* are made of water resistant material. In the lower support 4*a* and back support 4*b* further comprise a vent, such as an opening in the support which allows for distribution of trapped air between the user and the support. In one or more embodiments, the back support 4*b* is connected to the lower support 4*a* such that the back support 4*b* can fold down and rest on top of the lower support 4*a* for storage purposes and/or for the user to sit on so that the user is sitting up higher in the blind. For example, the back support 4*b* may be connected to the lower support 4*a* through a hinge mechanism.

In one or more embodiments, the seat 4 further comprises an arm rest. Additionally, in one or more embodiments, the back support 4*b* is connected to the lower support 4*a* so that the back support 4*b* may recline.

The seat plate 6 is plate like structure that is attached to the underside of the seat 4. As depicted in FIG. 2, the seat plate 6 is first attached to a seat swivel 9 and then to the seat 4. The seat swivel 9 provides for 360-degree movement of the seat 4. Any swivel 9 known in the art may be used. In one embodiment, the seat plate 6 is attached via four holes in the corners of the seat plate 4, corresponding holes in the seat swivel 9, and screws. However, other attached means may be used including glue, nails, or staples. The seat plate 6 provides support for the seat 4 and allows for a connection point between the seat 4 and the tether arm 8. In one embodiment, the seat plate 6 is made of metal. However, the seat plate may be made of any suitable material such as wood, composite, steel, aluminum, or plastic. The seat plate 6 is also attached to the vertical support member 5. The vertical support member 5 provides space between the floor of the blind and the seat to allow for user comfort and user mobility. In one embodiment, the vertical seat riser 5 allows for telescoping movement so that the seat height may be adjusted. In one or more embodiments, the vertical support member 5 further comprises a hydraulic mechanism which allows the user to increase or decrease the distance between the floor of the blind and the seat (i.e. raise and lower the seat) as known in the art.

In the depicted embodiment, the vertical support member 5 has a connection means on the end opposite the seat plate 6, which accepts the wheel 7. In one embodiment, the wheel is made of rubber; however, any wheeled device that enables relatively low friction or relatively easy rolling may be used. In one embodiment depicted in FIG. 2, the wheel mount is a swivel castor. This configuration allows for 360-degree directional movement. In one embodiment, the swivel castor is made of cast iron. In other embodiments, the swivel caster is made of aluminum. In various other embodiments, the swivel castor may be made of plastic or stainless steel or any other suitable material. In other embodiments, there may be multiple wheels attached to the vertical riser. In one embodiment, two wheels are attached to the vertical riser, one on each side. In other embodiments, the seat comprises more than one seat riser that may or may not swivel; each seat riser is connected to at least one wheel.

The tether arm 8 is connected to the vertical support member 5 on one end and to the tether arm hinge 10 on the other. In one embodiment, the tether arm 8 and vertical support member 5 are molded as a single piece. In other embodiments the tether arm 8 and seat riser 5 are separate pieces connected via welds or any other suitable connector means, such as mechanical fasteners. For example, in one embodiment, the tether arm 8 and seat riser 5 are connected via a hinge apparatus as known in the art. In other embodiments, the tether arm 8 and riser 5 are connected by a ball and socket joint.

As depicted in FIGS. 1 and 2, the tether arm 8 may itself comprise two pieces connected to each other. The connection between the first 8*a* and second piece 8*b* allows the tether arm 8 to telescope based on the size of the blind and number of users within the blind. The user may set the length of the tether arm 8 and then secure the tether arm via the connection means. In one embodiment, the connection means between the first and second piece is a locking nut and bolt. However, any suitable removable connection means that allows for easy adjustment of the length of the tether arm 8 may be used. In one or more embodiments, the length of the tether arm 8 is fixed and the first 8a and second piece 8b are secured via a ball and joint socket. In other embodiments, the first 8a and second piece 8b are secured by a hinge or bracket as known in the art.

The tether arm hinge 10 is depicted in FIG. 4a, b. In the depicted embodiment, the tether arm hinge 10 comprises a clip ring 12, collar 13, pin 14, pin sleeve 15, and pin receptacle 16. The clip ring 12 and collar 13 fit around the pin 14. The pin 14 is encapsulated by the pin sleeve 15. The pin sleeve 15 then fits within the pin receptacle of the sliding hinge receptacle 3. This configuration allows the seat to maneuver within the blind in an arc around the hinge and simultaneously rotate 360-degrees. In other embodiments, other hinge systems may be used as the tether arm hinge 10. In one embodiment a roller bearings hinge is used. In another embodiment, a plastic insert mechanism may be used to allow the hinging movement.

Figure 7:
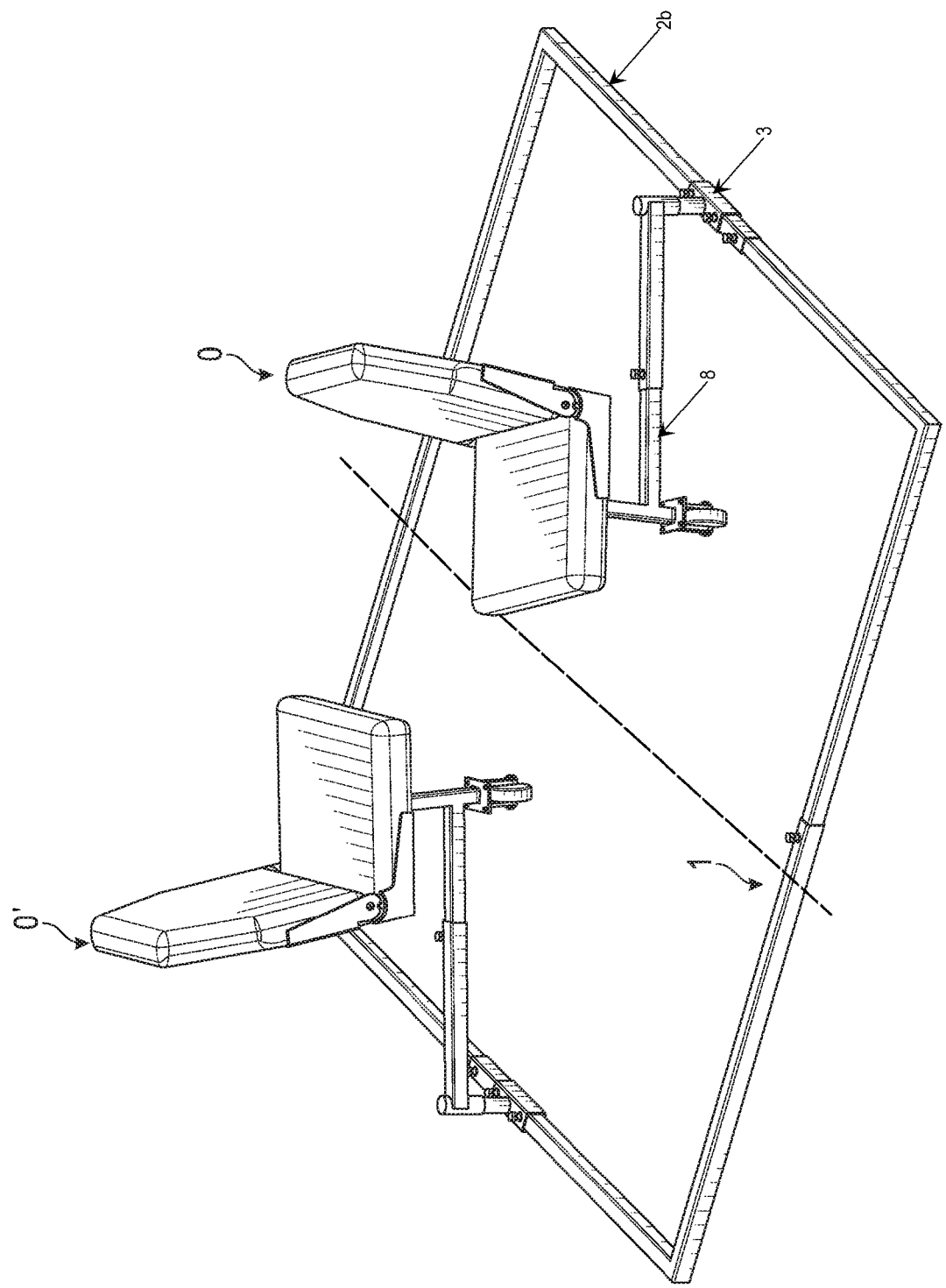
FIG. 7 is a depiction of the embodiment with two seat assemblies.

The blind seat system may incorporate more than one seat assembly 0 as depicted in FIG. 7. The seat size and number of seat assemblies are necessarily confined to within the footprint of the structural support frames 1a, 1b, 2a, 2b. The seat assemblies 0, 0' may be positioned based on user preference and available space. The tether arm 8 and sliding hinge receptacle 3 allow the user(s) to strategically place the seat assemblies 0, 0' around the blind using the telescoping and sliding features. The position of the structural support frame 1 coupled with the fact that only one sliding hinge receptacle 3 can occupy a specific position on the structural support frame 1 at one time, offers a safety failsafe. That is, the seat assemblies 0, 0' are positioned such that no user is physically capable of maneuvering between a second user and the walls of the blind. The dotted line of FIG. 7 depicts the boundaries of each seat assembly. The tether arm 8 will never extend beyond the dotted line, no matter where the sliding hinge receptacle 3 is slid along the frame section 2b. That is, the tether arm 8 can be expanded and contracted to move the seat 0 towards and away from the dotted line. And the sliding hinge receptacle 3 allows the seat to swing from one side of the blind to the other. However, the seat 0 can never collide or cross the path of the other seat 0'. This is especially relevant while hunting, as it prevents a user from occupying the space between a second user's hunting rifle and the blind window or look out.

For the purpose of understanding the Integrated Blind Seat System, references are made in the text to exemplary embodiments, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Furthermore, the described features, advantages, and characteristics may be combined in any suitable manner in one or more embodiments. One skilled in the relevant art will recognize that the Integrated Blind Seat System may be practiced without one or more of the specific features or advantages of a particular embodiment. In other instances, additional features and advantages may be recognized in certain embodiments that may not be present in all embodiments.

Reference throughout this specification to "one embodiment," "an embodiment," "in the present embodiment," or similar language means that a particular feature, structure, or characteristic described in connection with the embodiment is included in at least one embodiment. Thus, appearances of the phrases "in one embodiment," "in an embodiment," "in the present embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

The invention claimed is:

1. A blind seat system comprising:
  a. a structural support frame located so as to define a perimeter within a blind, and
  b. at least one seat assembly comprising a lower support and at least one tether arm connected at one end to said structural support frame and at the other end to said seat assembly,
    wherein said tether arm is connected to said structural support frame in a manner which allows a user to position said seat assembly in a plurality of locations within the blind,
    wherein said structural support frame comprises at least two support frame sections, wherein said at least two support frame sections are connected so as to allow said at least two support frame sections to move horizontally telescopically relative to each other.

2. The blind seat of claim 1 wherein said tether arm is capable of being expanded and contracted.

3. The blind seat system of claim 1 wherein said tether arm comprises a first piece and a second piece and wherein said first piece is connected to said second piece so that said first piece and said second piece move telescopically relative to each other.

4. The blind seat system of claim 1 wherein said tether arm is connected to said structural support frame by a mechanism which allows the tether arm to maneuver within the structural support frame three-hundred and sixty degrees around said mechanism.

5. The blind seat system of claim 1 further comprising a tether arm hinge connected to the end of said tether arm and coupled with a sliding hinge receptacle removably connected to said structural support frame.

6. The blind seat system of claim 1 wherein said seat assembly further comprises a swivel.

7. The blind seat system of claim 1 wherein said seat assembly further comprises at least one wheel connected to at least one vertical support member.

8. The blind seat system of claim 1 wherein said lower support further comprises a swivel connected to the underside of said lower support.

9. The blind seat system of claim 1 comprising at least two seat assemblies.

10. The blind seat system of claim 1 wherein said lower support comprises water-resistant material.

11. A blind seat system comprising:
  a. at least two inner support frames fitted within at least two outer support frames and connected via a frame connecting means so as to form a rectangular-shaped area at least partially enclosed within a blind;
  b. a seat;

c. a vertical support member comprising two ends wherein one end is connected to said seat and the second end is connected to at least one wheel;

d. a horizontal tether arm comprising two ends, one end connected to said vertical support member and a second end connected to at least one of said at least two outer support frames or said at least two inner support frames;

wherein said horizontal tether arm is connected to at least one of said at least two outer support frames or said at least two inner support frames by a tether arm hinge, said tether arm hinge configured to allow said seat to maneuver within said rectangular-shaped area.

12. The blind seat system of claim 11 wherein said tether arm hinge is connected to a sliding hinge receptacle removably attached to at least one of said at least two outer support frames or said at least two inner support frames.

13. The blind seat system of claim 11 further comprising at least two seats, and at least two corresponding vertical support members, horizontal tether arms, and tether arm hinges.

14. A blind seat system comprising:

a. a blind comprising at least one wall and a floor, wherein said floor comprises a perimeter, b. a structural support frame that is located along said perimeter so as to be in contact with the entire said perimeter, and c. at least one seat assembly comprising a lower support and at least one tether arm connected at one end to said structural support frame and at the other end to said seat assembly, wherein said tether arm is connected to said structural support frame in a manner which allows a user to position said seat assembly in a plurality of locations within said blind, wherein said structural support frame comprises at least two support frame sections, wherein said at least two support frame sections are connected so as to allow said at least two support frames to move telescopically relative to each other.

15. The blind seat system of claim 14 wherein said structural support frame is not in contact with the floor of the blind and is attached to said at least one wall of the blind.

16. The blind seat system of claim 14 wherein said structural support frame is permanently attached to the floor of the blind.

* * * * *